United States Patent Office 3,804,808
Patented Apr. 16, 1974

3,804,808
METHOD FOR POLYMERIZING FORMALDEHYDE
Takami Ishii, Yoshihiro Inuizawa, and Hiromi Kumahara, Ichihara, Japan, assignors to Ube Industries, Ltd., Ube-shi, Yamaguchi-ken, Japan
No Drawing. Filed May 25, 1972, Ser. No. 256,742
Claims priority, application Japan, Oct. 19, 1971, 46/82,124
Int. Cl. C08g 1/02
U.S. Cl. 260—67 FP        6 Claims

ABSTRACT OF THE DISCLOSURE

Improved method for polymerizing formaldehyde in the presence of a metal chelate compound as catalyst is described; formaldehyde is polymerized in a solution of bis(3-phenylacetylacetone)copper dissolved in an inert organic solvent at the concentration of $1\times10^{-9}$ to $5\times10^{-7}$ mole per liter of the solvent until the concentration of polymer in the resulting slurry reaches the range of 30 to 150 g./l.

The present invention relates to a method for polymerizing formaldehyde involving the use of a specific metal chelate compound as catalyst.

As a catalyst for the polymerization of formaldehyde, numerous compounds are already known such as, for example, amines, organo-tin compounds, organo-phosphor compounds, organo-arsenic compounds, metal carbonyls, oxides or hydroxides of alkali metals or alkali earth metals, organic nitro compounds, etc.

Japanese patent publications No. Sho 40–7073 and No. Sho 42–958 disclose methods of polymerizing formaldehyde in the presence of a metal chelate compound as catalyst. However, these methods need the use of a relatively large amount of the catalyst, i.e. $1\times10^{-5}$ to $1\times10^{-3}$ mole per mole of formaldehyde and accordingly, a considerable amount of the catalyst remains in the resulting polymer, which inevitably causes various troubles such as discoloration of the polymer and decomposition of the main chain of the polymer on shaping due to the metal cation contained in the catalyst. Therefore, these methods for the polymerization need a subsequent process for removing the catalyst from the polymer.

It is an object of the present invention to avoid these troubles, i.e. to provide a method for preparing improved high molecular weight polyoxymethylene which does not have such troubles as mentioned above even in the case where the step of removing the residual catalyst from the polymer is omitted.

In accordance with the present invention, there is provided a method for polymerizing formaldehyde in the presence of a metal chelate compound as catalyst characterized in that formaldehyde substantially free of water is polymerized in a solution of bis(3-phenylacetylactone) copper dissolved in an inert organic solvent at the concentration of $1\times10^{-9}$ to $5\times10^{-7}$ mole per liter of said inert organic solvent, until the concentration of polymer in the resulting slurry reaches the range of 30 to 150 g. per liter of said inert organic solvent.

By the term "formaldehyde substantially free of water" is herein meant formaldehyde containing no water or at most 1% by weight, preferably at most 0.5% by weight, of water.

A catalyst used in the present invention is bis(3-phenylacetylacetone)copper and the amount thereof used is $1\times10^{-9}$ to $5\times10^{7}$ mol per liter of an inert organic solvent. Because of its remarkably high catalytic effect compared with those of known metal chelate compounds, the catalyst enables the production of a high molecular weight polyoxymethylene even in a minor amount, e.g. 1/100 to 1/10,000 of the amounts of known metal chelate compounds. That is, the amount of the catalyst used in the present invention is far less compared with those of known chelate compounds, i.e. the former is $1\times10^{-9}$ to $1\times10^{-7}$ mole if calculated in terms of the amount per mole of formaldehyde, and the latter is $1\times10^{-5}$ to $1\times10^{-2}$ mole per mole of formaldehyde. Accordingly, the polyoxymethylene produced by the method of the present invention, even when the step of removing the residual catalyst therefrom is omitted, neither discolor on shaping nor break at their main chains because these contain only a trace of catalyst.

The high catalytic effect on the polymerization of formaldehyde is a characteristic of the catalyst used in the present invention. No other metal chelate compounds such as those comprising a combination of ether 3-phenylacetylacetone as ligand and a metal other than copper as a central atom or a compound other than 3-phenylacetylacetone as ligand and copper as a central atom exhibit any catalytic effect on the polymerization of formaldehyde in the case where the amount thereof used equals that of the present invention, but only exhibit the catalytic effect in the case where the amount thereof used is $1\times10^{-5}$ to $1\times10^{-2}$ mole per one mole of formaldehyde. The latter amount brings however the disadvantages previously stated, which will be apparent from examples and comparative examples hereinafter illustrated.

In the practice of the polymerization of the present invention, both the following methods can be employed; the first is a solution polymerization wherein formaldehyde is dissolved in an inert organic solvent followed by the addition of the copper chelate compound to initiate the polymerization, and the second is a blow polymerization wherein the polymerization is performed while formaldehyde is continuously blown into a solution of the copper chelate compound dissolved in an inert organic solvent.

As the inert organic solvent used in the present invention, any organic solvent inert to formaldehyde and the copper chelate compound can be used. It includes, for example, aliphatic hydrocarbons such as n-heptane, n-hexane, etc.; alicyclic hydrocarbons such as cyclopentane, cyclohexane, etc.; aromatic hydrocarbons such as benzene, toluene, tetraline, etc.; and halogenated derivatives thereof such as carbon tetrachloride, and mixtures thereof. Of these organic solvents, toluene and a mixture of toluene and another inert organic solvent at the ratio of 1:1 by weight are suitable for the solution polymerization and n-heptane and alicyclic hydrocarbons such as cyclohexane, cyclopentane, etc. are suitable for the blow polymerization.

The polymerization can be usually performed at a temperature of $-40°$ to $70°$ C. and either at an atmospheric pressure or at a high pressure. Suitable temperatures are $-30°$ to $50°$ C. for the solution polymerization and $10°$ to $60°$ C. for the blow polymerization. The pressure is necessarily such that the polymerization system is maintained in a liquid state.

In accordance with the present invention, the polymerization is continued until the concentration of polymer in the resulting slurry reaches the range of 30 to 150 g. per liter of the inert organic solvent. If the polymerization is still continued after the concentration of polymer exceeds the upper limit, it becomes hard to agitate the slurry and consequently, the rate of polymerization is remarkably reduced. In contrast, if the polymerization is stopped before the concentration of polymer reaches the lower limit, the heat consumption at the step of recovering the inert organic solvent from the resulting polymer slurry is inevitably increased.

Polyoxymethylenes obtained by the method of the present invention can be stabilized in the known manner. For example, when the polyoxymethylene has an appropriate molecular weight and is readily available for shaping, its end group, i.e. hydroxyl group may be stabilized in the manner illustrated in U.S. Pat. No. 2,998,408. When the polyoxymethylene has a remarkably high molecular weight and is incapable of being used for shaping as it is, the polymer may be treated in the manner described in Italian Pat. No. 893,724 thereby reducing the molecular weight and simultaneously stabilizing the end group of the polymer.

The following examples are given to illustrate the present invention and are not to be considered as limiting in any sense.

In the examples, the intrinsic viscosity ($\eta$) of the polyoxymethylene was determined on a solution of the polymer dissolved in p-chlorophenol containing 2% by weight of $\alpha$-pinene, at 60° C. using a Cannon-Fenske viscosimeter.

The rate constant ($K_{222}$) of thermal degradation was determined as follows: Approximately 1 g. of the specimen polymer was precisely weighed in the balance and enclosed in an ampul. The ampul, the top of which was open, was placed in a steam bath of methyl salicylate at 222° C. and weighed repeatedly at intervals of one minute. A graph of the logarithms of the weight (in percent) of the polymer remaining was plotted in regard to the time elapsed, over a period of thirty minutes subsequent to the first ten minutes. Since the thermal degradation is regarded as a first-order reaction, the rate of thermal degradation can be expressed by the slope in percent per minute.

Further, the slurry concentration means the concentration of polymer in the polymer slurry, expressed in gram per litre of the inert organic solvent. Yield is the percentage by weight, based on the amount of formaldehyde fed, of the amount of the resulting polymer whose end group is stabilized. All the parts are parts by weight unless otherwise specified.

EXAMPLE 1

1.5 l. of toluene was charged into a 3 l. reactor equipped with an agitator, a gas inlet, a catalyst inlet and a thermometer, followed by cooling to −78° C. Formaldehyde gas produced by the thermal decomposition of $\alpha$-polyoxymethylene was passed through a series of six U-shaped tube maintained at −18° C. and blown into the toluene until 100 g. of formaldehyde was dissolved therein. After the formaldehyde-toluene solution was heated up to −10° C., a solution of $1\times10^{-7}$ mole of bis(3-phenylacetyl-acetone)copper in 2 cc. of toluene was added to the formaldehyde-toluene solution to initiate the polymerization. The polymerization was continued for 60 minutes to obtain a slurry containing polyoxymethylene. At this point, the temperature of the slurry was 30° C. due to the heat of polymerization and the slurry concentation was 62 g./l. In order to determine the intrinsic viscosity of the polymer, a part of the polymer slurry so obtained was filtered out, washed with acetone and then, dried at 80° C. under reduced pressure for 3 hours. The intrinsic viscosity ($\eta$) was 7.3.

Half (700 g.) of the polymer slurry was charged into a 2 l. reactor followed by the addition of 200 g. of acetic acid anhydride. While the polymer slurry was heated at 110° C. under an atmosphere of nitrogen with agitation, 0.1 g. of boron trifluoride was added into the polymer slurry and the reaction mixture was maintained for 10 minutes to reduce the molecular weight of the polymer and simultaneouly stabilize the end group of the polymer.

After terminating the reaction by the addition of 5 cc. of tributylamine, the polymer so treated was filtered out, washed three times with 500 cc. of acetone and then, dried at 80° C. under reduced pressure for 3 hours to obtain 46 g. of the polymer (yield 92%).

0.5 part of polycondesate (degree of polymerization, 100) of malonic acid and xylene diamine as a heat stabilizer and 0.1 part of 2,2′-methylenebis(4-methyl-6-tert. butylphenol) as an antioxidant were added to 100 parts of the polymer. The stabilized polymer composition had an intrinsic viscosity ($\eta$) of 1.5 and a rate constant of thermal degradation $K_{222}$ of 0.01% per minute. The polymer composition exhibited pure whiteness even after the determination of the rate contant of thermal degradation.

EXAMPLES 2–6

Formaldehyde was polymerized in the same manner as that in Example 1 except that the polymerization conditions were varied as shown in Table I and, in Example 6, a mixture of toluene and cyclohexane at the ratio of 1:1 by weight was used in place of toluene. Slurry concentrations and intrinsic viscosities ($\eta$) of the unstabilized polymers are shown in Table I.

In order to stabilize the end group of the polymer and simultaneously reduce the molecular weight of the polymer, the polymer slurries were treated in the same manner as that in Example 1. Yields of the stabilized polymers are shown in Table I.

Further, 0.5 part of a heat stabilizer and 0.1 part of an antioxidant, both being the same as those in Example 1, were added to 100 parts of the polymers. Intrinsic viscosities ($\eta$) and rate constants of thermal degradation $K_{222}$ of the stabilized polymer compositions are also shown in Table I. In these Examples 2–6, the stabilized polymer compositions exhibited pure whiteness even after the determination of $K_{222}$.

TABLE I

| Example number | Amount of formaldehyde absorbed (g.) | Polymerization time (min.) | Amount of catalyst used (mol/l.) | Unstabilized polymer Slurry concentration (g./l.) | [$\eta$] | Stabilized polymer, yield (percent) | Stabilized polymer composition [$\eta$] | $K_{222}$ (percent/min.) |
|---|---|---|---|---|---|---|---|---|
| 2 | 100 | 60 | $1\times10^{-8}$ | 62 | 7.0 | 92 | 1.5 | 0.02 |
| 3 | 100 | 100 | $2\times10^{-8}$ | 62 | 7.2 | 90 | 1.5 | 0.02 |
| 4 | 160 | 60 | $1\times10^{-7}$ | 102 | 7.5 | 96 | 1.5 | 0.01 |
| 5 | 160 | 60 | $2\times10^{-8}$ | 100 | 7.0 | 93 | 1.5 | 0.01 |
| 6 | 100 | 60 | $1\times10^{-7}$ | 62 | 7.5 | 94 | 1.6 | 0.01 |

EXAMPLE 7

After the air in a 2-l. reactor equipped with an agitator, a gas inlet and a thermometer was replaced by nitrogen, a solution of $2\times10^{-9}$ mole of bis(3-phenylacetylacetone) copper in 1.25 l. of cyclohexane was charged thereinto. Polymerization was performed at 20° C. over a period of 100 minutes while formaldehyde gas produced by the decomposition of $\alpha$-polyoxymethylene was blown into the reactor through a series of six U-shaped tubes maintained at −18° C., at a ratio of 1.0 g./minute. The slurry concentration was 75 g./l. A part of the polymer slurry so obtained was filtered out, washed with acetone and then, dried at 80° C. under reduced pressure for 3 hours to determine the intrinsic viscosity. The intrinsic viscosity ($\eta$) was 8.2.

Half (550 g.) of the polymer slurry was charged into a 2-l. reactor followed by the addition of 150 g. of acetic acid anhydride. While the polymer slurry was heated at 110° C. under an atmosphere of nitrogen with agitation, 0.08 g. of boron trifluoride was added into the polymer slurry and the reaction mixture was maintained for 10 minutes to reduce the molecular weight of the polymer and simultaneously stabilize the end group of the polymer. After terminating the reaction by the addition of 5 cc. of tributylamine, the polymer so treated was filtered out, washed three times with 500 cc. of acetone and then, dried at 80° C. under reduced pressure for 3 hours to obtain 47 g. of the stabilized polymer (yield 94%).

0.5 part of a heat stabilizer and 0.1 part of an antioxidant, both being the same as those in Example 1, were added to 100 parts of the polymer. The stabilized polymer composition had an intrinsic viscosity ($\eta$) of 1.5 and a rate constant of thermal degradation $K_{222}$ of 0.01% per minute. The polymer composition exhibited pure whiteness even after the determination of the rate constant of thermal decomposition.

EXAMPLES 8–12

Formaldehyde was polymerized in the same manner as that in Example 7 except that the polymerization conditions were varied as shown in Table II. Slurry concentrations and intrinsic viscosities ($\eta$) of the unstabilized polymers are shown in Table II.

In order to stabilize the end group of the polymer and simultaneously reduce the molecular weight of the polymer, the polymer slurries were treated in the same manner as that in Example 7. The yields are shown in Table II. Further, 0.5 part of a heat stabilizer and 0.1 part of an antioxidant, both being the same as those in Example 1, were added to 100 parts of the stabilized polymers. Intrinsic viscosities ($\eta$) and rate constants of thermal degradation $K_{222}$ of the stabilized polymer compositions are also shown in Table II. In these Examples 8–12, the stabilized polymer compositions exhibited pure whiteness even after the determination of $K_{222}$.

0.5 part of a heat stabilizer and 0.1 part of an antioxidant, both being the same as those in Example 1, were added to 100 parts of the polymer. The stabilized polymer composition had an intrinsic viscosity ($\eta$) of 1.2 and a rate constant of thermal degradation $K_{222}$ of 0.3% per minute. The polymer exhibited a brown tinge after the determination of the rate constant of thermal degradation.

COMPARATIVE EXAMPLE 14

The procedure of polymerization in Example 7 was repeated wherein $4\times10^{-5}$ mole of bis(acetylacetone) copper was substituted for the bis(3-phenylacetylacetone) copper with all other conditions remaining the same. The slurry concentration was 62 g./l.

In order to stabilize the end group of the polymer and simultaneously reduce the molecular weight of the polymer, half (550 g.) of the polymer slurry was treated in the same manner as that in Example 1 to obtain 39 g. of the stabilized polymer (yield, 78%).

0.5 part of a heat stabilizer and 0.1 part of an antioxidant, both being the same as those in Example 1, were added to 100 parts of the polymer. The stabilized polymer composition had an intrinsic viscosity ($\eta$) of 1.3 and a rate constant of thermal degradation $K_{222}$ of 0.2% per minute. The polymer exhibited a brown tinge after the determination of the rate constant of thermal degradation.

What we claim is:

1. A method for preparing a high molecular weight polyoxymethylene from formaldehyde characterized in

TABLE II

| Example number | Amount of formaldehyde blown (g.) | Polymerization temperature (°C.) | Polymerization time (min.) | Amount of catalyst used (mol/l.) | Unstabilized polymer Slurry concentration (g./l.) | [$\eta$] | Stabilized polymer, yield (percent) | Stabilized polymer composition [$\eta$] | $K_{222}$ (percent /min.) |
|---|---|---|---|---|---|---|---|---|---|
| 8 | 100 | 20 | 100 | $1\times10^{-8}$ | 75 | 8.0 | 94 | 1.6 | 0.02 |
| 9 | 100 | 20 | 100 | $1\times10^{-7}$ | 75 | 8.5 | 95 | 1.7 | 0.01 |
| 10 | 150 | 20 | 150 | $2\times10^{-8}$ | 114 | 7.5 | 95 | 1.6 | 0.01 |
| 11 | 150 | 20 | 150 | $2\times10^{-7}$ | 113 | 8.0 | 94 | 1.6 | 0.01 |
| 12 | 100 | 40 | 100 | $5\times10^{-8}$ | 75 | 6.0 | 95 | 1.4 | 0.01 |

COMPARATIVE EXAMPLES 1–12

For purpose of comparison, the procedure of Example 1 was repeated wherein $1.5\times10^{-7}$ mole ($1\times10^{-7}$ mole per litre of the solvent) of known metal chelate compounds listed in Table III were separately used in place of the bis(3-phenylacetylacetone)copper with all other conditions remaining substantially the same. However, no polymerization took place even after five hours from the addition of the catalysts.

When the amounts of the known metal chelate compounds added were increased to $1.5\times10^{-6}$ mole ($1\times10^{-6}$ mole per liter of the solvent), no polymerization took place either even after five hours from the addition.

TABLE III

| Comparative Example No. | Metal Chelate Compound |
|---|---|
| 1 | Tris(acetylacetone)cobalt. |
| 2 | Bis(3-phenylacetylacetone)beryllium. |
| 3 | Bis(3-phenylacetylacetone)magnesium. |
| 4 | Bis(3-phenylacetylacetone)palladium. |
| 5 | Tris(3-phenylacetylacetone)chrome. |
| 6 | Tris(3-phenylacetylacetone)aluminum. |
| 7 | Tris(3-phenylacetylacetone)iron. |
| 8 | Bis(3-phenylacetylacetone)cobalt. |
| 9 | Tris(3-phenylacetylacetone)cobalt. |
| 10 | Bis(3-phenylacetylacetone)nickel. |
| 11 | Bis(acetylacetone)copper. |
| 12 | Bis(3-phenylacetylacetone)iron. |

COMPARATIVE EXAMPLE 13

The procedure of polymerization in Example 1 was repeated wherein $1.0\times10^{-4}$ mole of bis(3-phenylacetylacetone)iron was substituted for the bis(3-phenylacetylacetone)copper with all other conditions remaining substantially the same. The slurry concentration was 51 g./l.

In order to stabilize the end group of the polymer and simultaneously reduce the molecular weight of the polymer, half (700 g.) of the polymer slurry was treated in the same manner as that in Example 1 to obtain 38 g. of the stabilized polymer (yield, 76%).

that formaldehyde substantially free of water is polymerized in a solution of bis(3-phenylacetylacetone) copper dissolved in an inert organic solvent at a concentration of $1\times10^{-9}$ to $5\times10^{-7}$ mole per liter of said inert organic solvent until the concentration of polymer in the resulting slurry reaches the range of 30 to 150 g. per liter of said inert organic solvent.

2. A method as claimed in claim 1 wherein said formaldehyde contains no water or at most 1% by weight of water.

3. A method as claimed in claim 1 wherein said inert organic solvent is at least one selected from aliphatic, alicyclic and aromatic hydrocarbons and halogenated hydrocarbons.

4. A method as claimed in claim 1 wherein the polymerization is performed at temperatures of −40° to 70° C.

5. A method as claimed in claim 1 wherein the polymerization is performed in a manner such that said bis(3-phenylacetylacetone) copper is added to the solution of formaldehyde dissolved in said inert organic solvent and the reaction mixture is maintained at a temperature of −30° to 50° C.

6. A method as claimed in claim 1 wherein the polymerization is performed in a manner such that formaldehyde is continuously blown into the solution of said bis(3-phenylacetylacetone) copper dissolved in said inert organic solvent at a temperature of 10° to 60° C.

References Cited

UNITED STATES PATENTS

| | | | |
|---|---|---|---|
| 3,267,076 | 8/1966 | Ishii et al. | 260—67 FP |
| 3,305,529 | 2/1967 | Reynolds | 260—67 FP |
| 3,639,347 | 2/1972 | Sugiura et al. | 260—64 |

LUCILLE M. PHYNES, Primary Examiner